No. 629,742. Patented July 25, 1899.
H. J. CARDEN.
SELF DRAINING CULINARY VESSEL.
(Application filed Mar. 29, 1898.)
(No Model.)
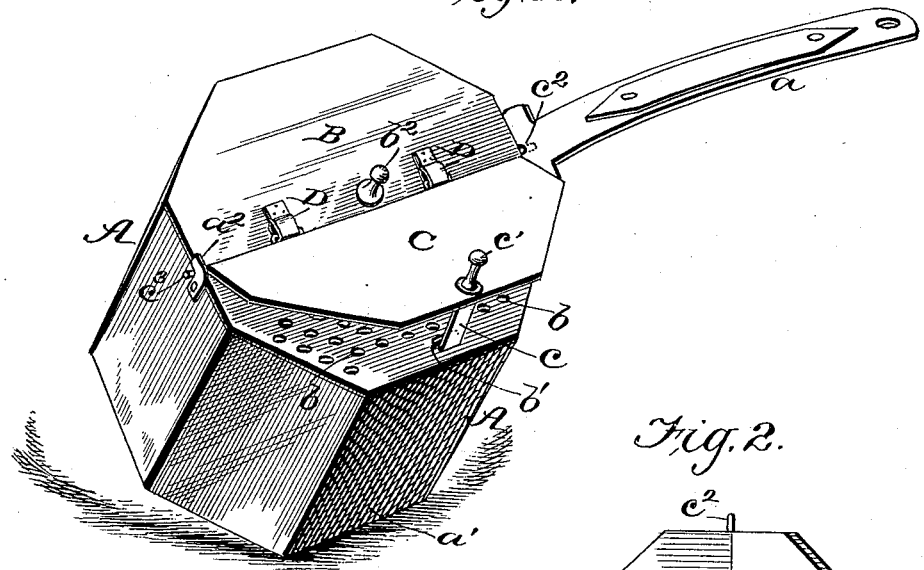
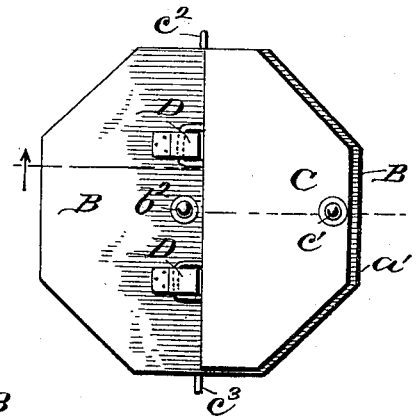
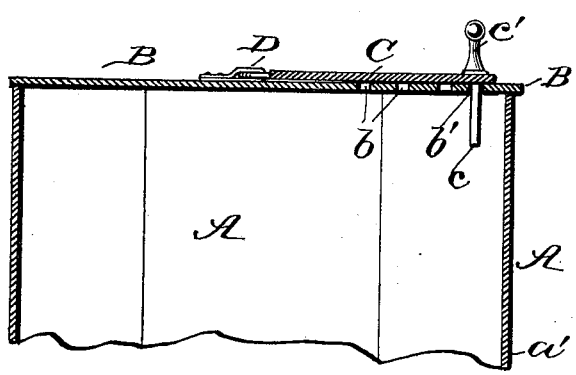
WITNESSES:
Jos. A. Ryan
Amos W. Hart
INVENTOR
Helen J. Carden.
BY Munn & Co.
ATTORNEYS.
THE NORRIS PETERS CO., PHOTO-LITHO., WASHINGTON, D. C.

UNITED STATES PATENT OFFICE.

HELEN J. CARDEN, OF BAKERSFIELD, CALIFORNIA, ASSIGNOR OF ONE-THIRD TO ANNIE E. HUGHES, OF FRESNO, CALIFORNIA.

SELF-DRAINING CULINARY VESSEL.

SPECIFICATION forming part of Letters Patent No. 629,742, dated July 25, 1899.

Application filed March 29, 1898. Serial No. 675,650. (No model.)

*To all whom it may concern:*

Be it known that I, HELEN J. CARDEN, a citizen of the United States, residing at Bakersfield, in the county of Kern and State of California, have invented an Improvement in Self-Draining Culinary Vessels, of which the following is a specification.

Saucepans and other culinary vessels used for boiling vegetables and other solid foods are ordinarily so constructed as to require them to be held or supported manually while the liquid contents are being drained therefrom. My improvement consists in so constructing the body of such a culinary vessel that it may be placed on its side and will be self-supporting in such position; also, in so constructing and attaching the cover that it allows drainage without becoming detached, although it may be readily removed by a simple lateral movement whenever necessary. The cover proper has a series of drainage-openings that are normally closed by a hinged flap or lid which allows the escape of steam when the same exerts due pressure. In this respect, therefore, the lid or flap performs the function of a safety-valve.

In the accompanying drawings, Figure 1 is a perspective view of my improved saucepan in inclined position and the hinged lid raised to allow drainage and escape of steam. Fig. 2 is a plan view of the cover detached. Fig. 3 is a vertical section of the saucepan, the line thereof being as indicated in Fig. 2.

The body A of the saucepan is octagonal in shape and provided with a lateral handle $a$. The detachable cover B, which is also octagonal, has numerous perforations $b$ on one side of its center and also a slot $b'$ for reception of a tongue or pendent rest $c$, forming a permanent attachment of a hinged flap or lid C. The latter covers the perforated portion of part B and is loosely but permanently attached thereto by means of hinges D. The flat sheet-metal loops constituting part of said hinges are elongated to permit the wire pintles or loops of the lid C to slide backward and forward therein. When said lid is pushed back, and thus in normal closed position on the cover B, as shown in Figs. 2 and 3, the pintles are at the rear ends of the hinged loops and the tongue $c$ projects through the slot $b'$ in cover B. This is the relation of parts when the saucepan is in use for cooking vegetables and other foods. When it is desired to drain off the hot liquid contents of the saucepan after cooking some article of food, it is inclined more or less and the lid or flap C raised and allowed to slide down so that the tongue $c$ rests on the imperforate portion of the cover B, as shown in Fig. 1. The cook may incline the saucepan as conditions require, but ordinarily it will be laid flat on its side, horizontally, whereby it is self-supporting, and it may be left in that position to allow the drainage and escape of steam to continue as long as desired. To facilitate opening and adjusting the lid or flap C, it is provided with a knob $c'$.

The cover B is adapted to be easily and quickly detached from body A by reason of peculiar means of connection therewith. Thus pins $c^2 c^3$, Fig. 2, project laterally from opposite sides of said cover, and one of them enters a socket in the handle $a$, while the other slides into the notch or open slot of a lug or ear $a^2$, attached to the body A. It will be understood that the pin $c^2$ is first inserted in the handle-socket and the pin $c^3$ next engaged with lug $a^2$, as shown in Fig. 1. By this construction and combination of parts the cover B, with its attached supplemental lid C, is prevented from sliding down and becoming displaced when the saucepan is inclined or laid upon its side $a'$; but it may be quickly detached by two lateral movements, as will be readily understood. For conveniently effecting such detachment I provide the cover with a knob $b^2$.

The form of the body A, whereby it is self-supporting when inclined or laid upon its side, the detachable perforated cover, and the hinged adjustable lid or flap therefor, which is adapted for self-support to permit drainage and escape of steam, make my saucepan a particularly useful and valuable addition to the culinary vessels in general use. It may be constructed of agate or other protected kinds of sheet metal and at small cost.

What I claim is—

1. A culinary vessel, or saucepan, composed of a body adapted for self-support when resting on its side, a cover having perforations adjacent to such side, a flap or lid hinged loosely to said cover and adapted to close the perforations when in normal position, and a rest or support, attached to the lid, and adapted to rest on the cover for holding said lid raised and thus allow drainage of the saucepan, substantially as shown and described.

2. The combination of the cover, having rigid pins projecting laterally from diametrically opposite points, with the body of the saucepan, having on one side the lateral handle $a$, provided with a socket as specified, and on the opposite side a notched lug, whereby the cover may be attached as shown and described.

3. The combination with the body of the saucepan having a flat front side, of a cover having perforations in the portion adjacent to said side, a lid or flap held upon the cover and provided with hinges that permit it to slide forward, and means for holding said lid in raised position, substantially as shown and described.

4. The combination with the saucepan, of a cover, having a perforated portion adjacent to one side, the remaining portion being imperforate, and a flap or lid hinged loosely to said cover and arranged to close the perforation when in normal position, a tongue secured to the lid and projecting through a slot in the cover when said lid is in normal position and adapted to rest upon the imperforate portion of the cover when the lid slides downward and thus support it in raised position, substantially as shown and described.

5. The combination, with the saucepan-body having a flat front side, of the detachable cover, having perforations and a slot in the portion adjacent to said side, the lid attached to the cover by sliding hinges, and having a pendent tongue adapted to project down through said slot, or to rest upon the cover, as the case may be, substantially as shown and described.

HELEN J. CARDEN.

Witnesses:
FLORA F. FIREBAUGH,
W. M. CARDEN.